(12) United States Patent
Takeshita et al.

(10) Patent No.: US 10,750,259 B2
(45) Date of Patent: *Aug. 18, 2020

(54) OPTICAL NETWORK MANAGEMENT APPARATUS AND METHOD OF ALLOCATING OPTICAL FREQUENCY BAND

(71) Applicant: NEC CORPORATION, Tokyo (JP)

(72) Inventors: Hitoshi Takeshita, Tokyo (JP); Shinsuke Fujisawa, Tokyo (JP); Tomoyuki Hino, Tokyo (JP); Akio Tajima, Tokyo (JP)

(73) Assignee: NEC CORPORATION, Minto-ku, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/444,803

(22) Filed: Jun. 18, 2019

(65) Prior Publication Data

US 2019/0306597 A1 Oct. 3, 2019

Related U.S. Application Data

(63) Continuation of application No. 16/078,103, filed as application No. PCT/JP2017/006060 on Feb. 20, 2017, now Pat. No. 10,375,460.

(30) Foreign Application Priority Data

Feb. 23, 2016 (JP) ................................ 2016-031563

(51) Int. Cl.
*H04Q 11/00* (2006.01)
*H04J 14/02* (2006.01)
*H04B 10/27* (2013.01)

(52) U.S. Cl.
CPC ......... *H04Q 11/0062* (2013.01); *H04B 10/27* (2013.01); *H04J 14/0256* (2013.01);
(Continued)

(58) Field of Classification Search
CPC ....... H04Q 11/0062; H04Q 2011/0073; H04Q 2011/0086; H04B 10/27; H04J 14/0256; H04J 14/0272
(Continued)

(56) References Cited

U.S. PATENT DOCUMENTS

| 10,375,460 | B2 * | 8/2019 | Takeshita | ............ H04J 14/0272 |
| 2010/0220996 | A1 * | 9/2010 | Lee | ..................... H04J 14/0227 398/25 |

(Continued)

FOREIGN PATENT DOCUMENTS

| JP | 2010-098544 A | 4/2010 |
| JP | 2013-501420 A | 1/2013 |

(Continued)

OTHER PUBLICATIONS

Written Opinion Report for PCT/JP2017/006060, dated Apr. 25, 2017.

(Continued)

*Primary Examiner* — Dalzid E Singh
(74) *Attorney, Agent, or Firm* — Sughrue Mion, PLLC

(57) ABSTRACT

It is difficult to improve the usage efficiency of an optical communication network due to the passband narrowing effect in a wavelength selection process in an optical communication network using a wavelength division multiplexing system; therefore, an optical network management apparatus according to an exemplary aspect of the present invention includes wavelength selection information generating means for generating wavelength selection information on a wavelength selection process through which an optical path accommodating an information signal goes, with respect to each optical path; and wavelength selection
(Continued)

information notifying means for notifying an optical node device through which the optical path goes of the wavelength selection information.

20 Claims, 13 Drawing Sheets

(52) U.S. Cl.
CPC .. *H04J 14/0272* (2013.01); *H04Q 2011/0073* (2013.01); *H04Q 2011/0086* (2013.01)

(58) Field of Classification Search
USPC .......................................................... 398/58
See application file for complete search history.

(56) References Cited

U.S. PATENT DOCUMENTS

| | | | |
|---|---|---|---|
| 2011/0026925 A1 | 2/2011 | Mu et al. | |
| 2012/0224851 A1* | 9/2012 | Takara | H04B 10/0793 398/45 |
| 2013/0230316 A1* | 9/2013 | Hussain | H04J 14/0272 398/34 |
| 2015/0280852 A1* | 10/2015 | Nakagawa | H04J 14/0212 398/34 |

FOREIGN PATENT DOCUMENTS

| | | |
|---|---|---|
| WO | 2011/030897 A1 | 3/2011 |
| WO | 2015/182070 A1 | 12/2015 |

OTHER PUBLICATIONS

Fujisawa et al., "Utilization of Spectrum Slot Fragmentation to Improve Network Resource Efficiency on Elastic Optical Network", Optical Fiber Communications Conference and Exhibition (OFC), Mar. 22, 2015, pp. 1-3 (total 3 pages).

International Search Report for PCT/JP2017/006060, dated Apr. 25, 2017.

\* cited by examiner

NUMBER OF PASS-THROUGH OPTICAL NODES

OPTICAL NETWORK MANAGEMENT APPARATUS AND METHOD OF ALLOCATING OPTICAL FREQUENCY BAND

CROSS-REFERENCE TO RELATED APPLICATIONS

This application is a Continuation of U.S. application Ser. No. 16/078,103, filed Aug. 21, 2018, which is a National Stage of International application no. PCT/JP2017/006060, filed Feb. 20, 2017, claiming priority base on Japanese Patent application no. 2016-031563, filed Feb. 23, 2016, the disclosures of all of which are incorporated herein in their entirety by reference.

TECHNICAL FIELD

The present invention relates to optical network management apparatuses and methods of allocating optical frequency band, and in particular, relates to an optical network management apparatus and a method of allocating optical frequency band in an optical communication network using a wavelength division multiplexing system.

BACKGROUND ART

Because of rapid expansion of mobile traffic and video services, there is a demand for increasing a communication capacity in a core network. The demand for increasing the capacity tends to continue in the future. In order to increase the communication capacity continuously at a limited cost, it is effective to improve usage efficiency of the network by efficiently operating resources of the network.

Especially in an optical communication network that handles a significantly large amount of information, it is important to use optical frequency bands efficiently that are communication resources. If an optical frequency band in an optical communication network is used, it is necessary to consider deterioration in optical signal quality caused by constraints of various physical laws in optical signal transmission. The physical constraints in this case include a crosstalk between adjacent wavelength channels in the wavelength multiplexing optical signal transmission, deterioration in an S/N (Signal/Noise) ratio caused by an optical fiber loss or an optical noise added by an optical amplifier, for example. In addition, the above-mentioned physical constraints also include the passband narrowing effect caused by passing through a plurality of optical band pass filters (BPF). Considering and dealing with these physical constraints make it possible to improve the usage efficiency of the resources in an optical communication network. As a result, the transfer cost of large volumes of information bits can be reduced.

Patent Literature 1 discloses an example of the technologies to control the deterioration of received signal quality caused by passing through a plurality of optical band pass filters (BPF) as mentioned above.

In the method of setting a passband of a path described in Patent Literature 1, a wide passband is set in a wavelength selective switch through which the path passes, with respect to a path that passes through a large number of wavelength selective switches, whose filtering penalty becomes large. With respect to a path that passes through a small number of wavelength selective switches, a narrow passband is set in the wavelength selective switches through which the path passes. A path with a narrow passband is arranged adjacent to a path that requires a wide passband.

It is said that the above-described configuration makes it possible to provide technologies to construct an optical transmission network in which reception quality of signal light on each path is improved as a whole without limiting a transmission rate or a scale of the optical transmission network as far as possible.

It is described in Patent Literature 2 that a bandwidth variable communication system uses a higher order modulation format and a narrowband filter corresponding to it for an optical communication path having a short transmission distance, and a lower order modulation format and a broadband filter corresponding to it for an optical communication path having a long transmission distance. It is said that this system makes it possible to reduce a spectral range required in total and improve the frequency usage efficiency.

CITATION LIST

Patent Literature

[PTL 1] Japanese Unexamined Patent Application Publication No. 2010-098544
[PTL 2] WO2011/030897

SUMMARY OF INVENTION

Technical Problem

In order to improve the usage efficiency of an optical communication network, it is desirable to have the smallest possible amount of an optical frequency band per bit occupied by information accommodated in an optical path. However, in order to avoid deterioration of the optical signal quality caused by the above-mentioned physical constraints, an extra optical frequency band will be required in addition to the optical frequency band required to transmit only an information bit. The extra optical frequency band to be required is referred to as a guard band. Because the guard band is not used for transmitting an information bit, the usage efficiency of the optical communication network decreases as the more optical frequency bands are required for the guard band. Therefore, it is desirable to use a smaller guard band.

The total amount of the guard bands to be required for an optical communication network changes depending on various factors, that is, what type of optical path is open or what kind of optical frequency band is allocated to the optical path. Consequently, even though the hardware such as an optical node, an optical fiber, and an optical transceiver is the same, the operation and the control method of it makes it possible to improve the usage efficiency of the optical communication network. If the usage efficiency of the optical communication network can be improved without changing the hardware, it is possible to reduce the transfer cost of large volumes of information bits. Accordingly, various optical paths and various methods of allocating optical frequency bands have been proposed.

An optical signal is transmitted from an optical signal transmission source to an optical signal reception destination through a plurality of optical nodes. The route leading from the optical signal transmission source to the optical signal reception destination is an optical path. An optical path usually passes through a plurality of optical nodes. The optical node includes an optical band pass filter (BPF) in order to perform a wavelength selection process of selecting a wavelength-multiplexed optical signal. Consequently, the optical path passes through a plurality of optical BPFs. If the optical path passes through a plurality of optical BPFs, the passband is limited due to the passband narrowing effect, and the optical signal quality deteriorates, as mentioned above. In order to keep the optical signal quality from deteriorating due to the passband narrowing effect of the optical BPF, it is necessary to provide the above-mentioned guard band in advance.

In the above-mentioned method of setting a passband for a path described in Patent Literature 1, a path with a narrow passband is arranged adjacent to a path that requires a wide passband. Consequently, the guard bands are provided at both ends of the optical frequency band occupied by a plurality of optical paths adjacent to each other. In this case, because the bandwidth of the guard band cannot be optimized with respect to each optical path, unnecessary guard bands are provided, taken as a whole, for the optical communication network including a plurality of optical paths. As a result, it is difficult to improve the usage efficiency of the optical communication network.

As described above, there has been the problem that it is difficult to improve the usage efficiency of an optical communication network due to the passband narrowing effect in a wavelength selection process in an optical communication network using a wavelength division multiplexing system.

The object of the present invention is to provide an optical network management apparatus and an method of allocating optical frequency band that solve the above-mentioned problem that it is difficult to improve the usage efficiency of an optical communication network due to the passband narrowing effect in a wavelength selection process in an optical communication network using a wavelength division multiplexing system.

Solution to Problem

An optical network management apparatus according to an exemplary aspect of the present invention includes wavelength selection information generating means for generating wavelength selection information on a wavelength selection process through which an optical path accommodating an information signal goes, with respect to each optical path; and wavelength selection information notifying means for notifying an optical node device through which the optical path goes of the wavelength selection information.

A method of allocating optical frequency band according to an exemplary aspect of the present invention includes generating wavelength selection information that is information on a wavelength selection process through which an optical path accommodating an information signal goes, with respect to each optical path; and determining, based on the wavelength selection information, a passband width in the wavelength selection process with respect to each optical path.

Advantageous Effects of Invention

According to an optical network management apparatus and a method of allocating optical frequency band of the present invention, in an optical communication network using a wavelength division multiplexing system, it is possible to improve the usage efficiency of the optical communication network even though the passband narrowing effect occurs in the wavelength selection process.

EXAMPLE EMBODIMENT

Example embodiments of the present invention will be described below with reference to the drawings.

First Example Embodiment

Figure 1A:
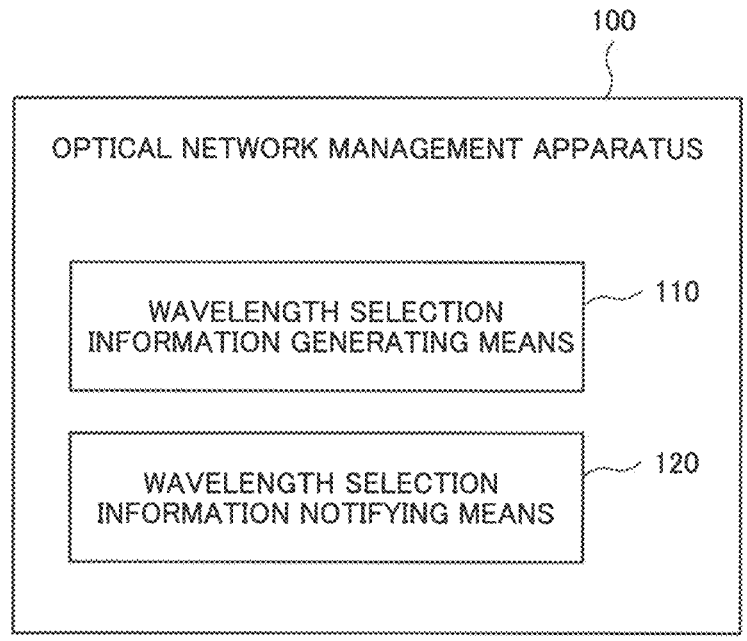
FIG. 1A is a block diagram illustrating a configuration of an optical network management apparatus according to a first example embodiment of the present invention.

FIG. 1A is a block diagram illustrating a configuration of an optical network management apparatus 100 according to a first example embodiment of the present invention.

The optical network management apparatus 100 includes a wavelength selection information generating means 110 and a wavelength selection information notifying means 120. The wavelength selection information generating means 110 generates wavelength selection information on a wavelength selection process through which an optical path accommodating an information signal goes, with respect to each optical path. The wavelength selection information notifying means 120 notifies an optical node device through which the optical path goes of the wavelength selection information.

As described above, the optical network management apparatus 100 according to the present example embodiment is configured to generate the wavelength selection information on the wavelength selection process through which the optical path goes, with respect to each optical path. This makes it possible to determine, with respect to each optical path, an optimum passband width for the optical path depending on the wavelength selection process. As a result, according to the optical network management apparatus 100 of the present example embodiment, in an optical communication network using a wavelength division multiplexing system, it is possible to improve the usage efficiency of the optical communication network even though the passband narrowing effect occurs in the wavelength selection process.

The above-mentioned wavelength selection information can be the information, with respect to each optical path, on a bandwidth of a protection band (a guard band) added to a frequency band for an information signal.

Alternatively, the above-mentioned wavelength selection information may be the information, with respect to each optical path, on the number of optical band pass filters (BPFs) through which the optical path goes. In this case, the optical network management apparatus 100 can be configured to set an optical path so as to decrease the number of optical band pass filters (optical BPFs) through which the optical path passes. The optical network management apparatus 100 may preferentially set an optical path in the order of the number of optical band pass filters (optical BPFs) through which the optical path passes from smallest.

The optical network management apparatus 100 can be configured to include further a passband width determining means that determines a passband width in the wavelength selection process with respect to each optical path, based on the above-mentioned wavelength selection information. The above-mentioned passband width is a bandwidth including a frequency band for the information signal and a protection band (a guard band) added to the frequency band.

The passband width determining means can be configured, if optical paths include a first optical path and a second optical path that lie next to each other, to choose a protection band with a larger bandwidth between a first protection band for the first optical path and a second protection band for the second optical path. That is to say, the passband width determining means calculates the bandwidth of the first protection band that becomes a protection band for the first optical path with the center wavelength equal to a first wavelength. The passband width determining means also calculates the bandwidth of the second protection band that becomes a protection band for the second optical path with the center wavelength equal to a second wavelength lying next to the first wavelength on a wavelength grid. The passband width determining means can be configured to choose one having a larger bandwidth as the protection band.

Figure 1B:
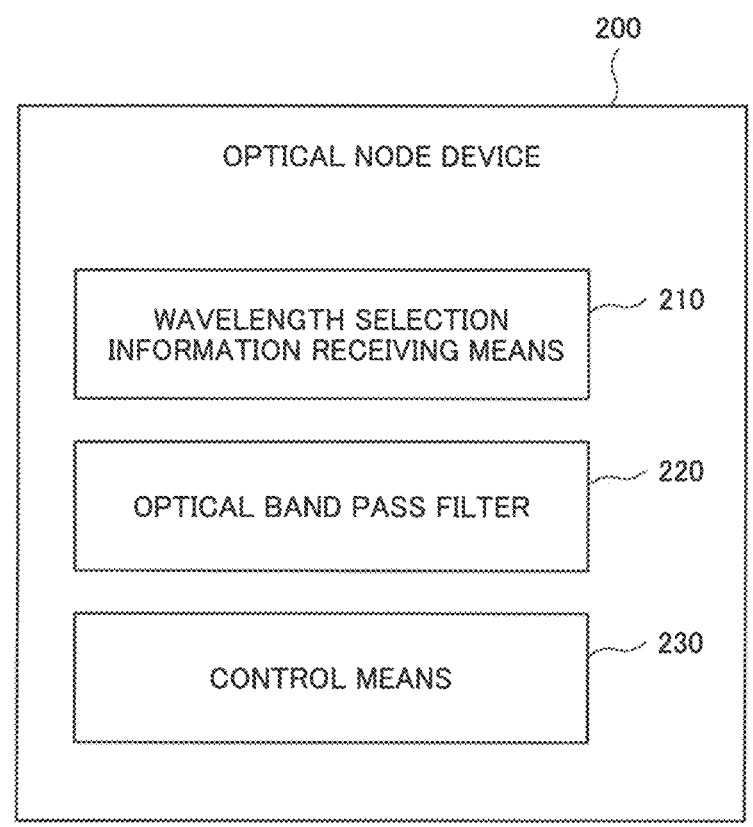
FIG. 1B is a block diagram illustrating a configuration of an optical node device according to the first example embodiment of the present invention.

FIG. 1B illustrates a configuration of an optical node device 200 that constitutes an optical network system together with the optical network management apparatus 100. The optical node device 200 includes a wavelength selection information receiving means 210, an optical band pass filter (BPF) 220 with a variable passband width, and a control means 230.

The wavelength selection information receiving means 210 receives wavelength selection information from the wavelength selection information notifying means 120 included in the optical network management apparatus 100. The control means 230, based on the wavelength selection information, sets the passband width of the optical band pass filter 220 with respect to each optical path. The passband width is a bandwidth including the frequency band for the information signal and the protection band (guard band) to be added to the frequency band.

The above-described configuration of the optical node device 200 makes it possible to optimize the passband width of the optical band pass filter 220 with respect to each optical path depending on the wavelength selection process.

Next, the method of allocating optical frequency band according to the present example embodiment will be described.

In the method of allocating optical frequency band of the present example embodiment, first, wavelength selection information is generated that is information on a wavelength selection process through which an optical path accommodating an information signal goes, with respect to each optical path. Based on the selection information, a passband width in the wavelength selection process is determined with respect to each optical path.

The above-mentioned wavelength selection information can be the information, with respect to each optical path, on the number of optical band pass filters through which the optical path goes. Alternatively, the wavelength selection information may be the information, with respect to each optical path, on a bandwidth of the protection band (guard band) added to the frequency band for the information signal.

If the optical paths include a first optical path with the center wavelength equal to a first wavelength and a second optical path with the center wavelength equal to a second wavelength lying next to the first wavelength on a wavelength grid, the method of allocating optical frequency band according to the present example embodiment can further perform the following processes. That is to say, first, a bandwidth of a first protection band that becomes a protection band for the first optical path is calculated. A bandwidth of a second protection band that becomes a protection band for the second optical path is also calculated. Then a protection band with a larger bandwidth can be chosen between the first protection band and the second protection band.

Next, the method of allocating optical frequency band according to the present example embodiment will be described in more detail.

First, a related method of allocating an optical frequency band to an optical path will be described.

Figure 2A:
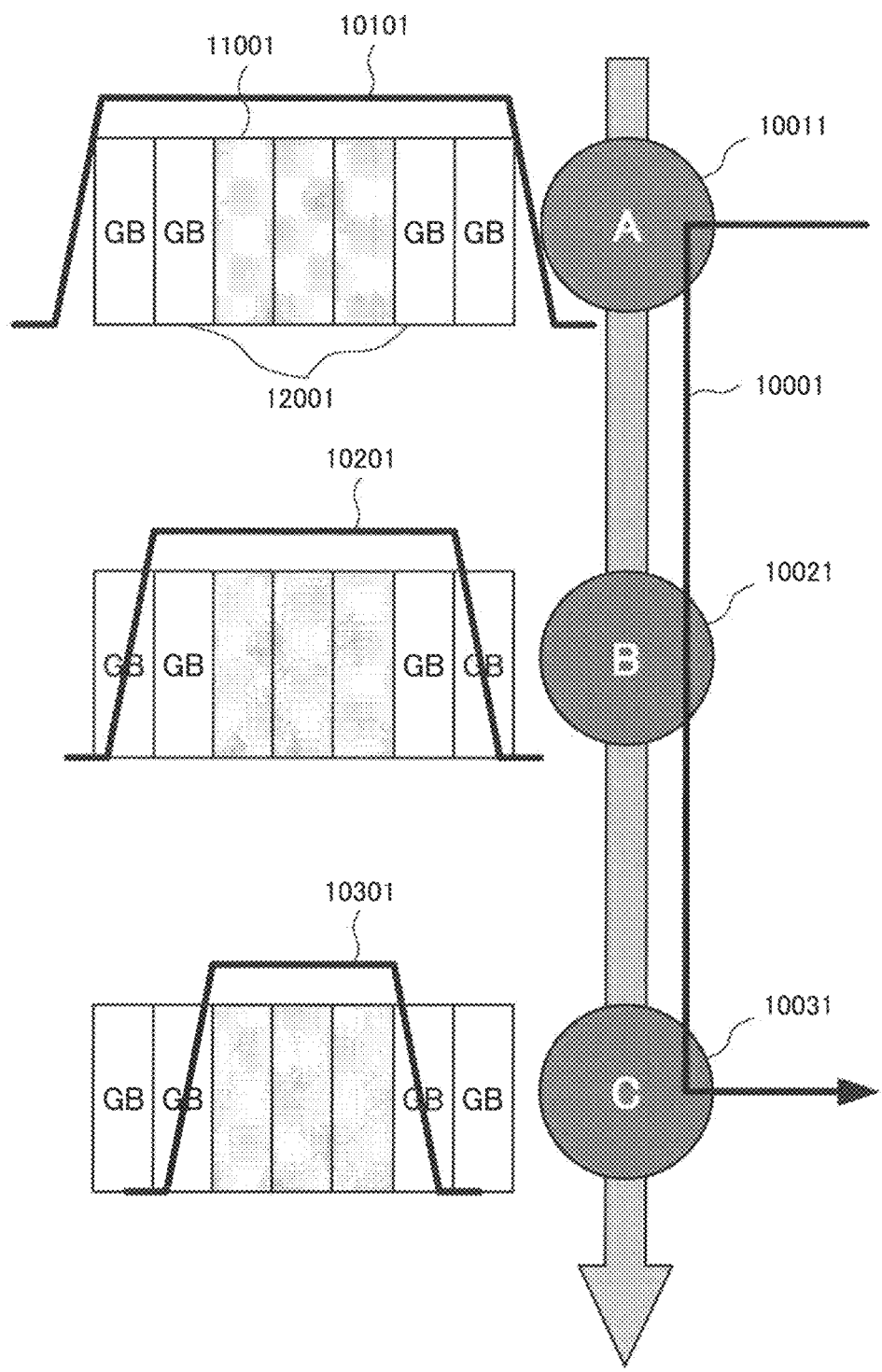
FIG. 2A is a diagram to explain a related method of allocating optical frequency band.
Figure 2B:
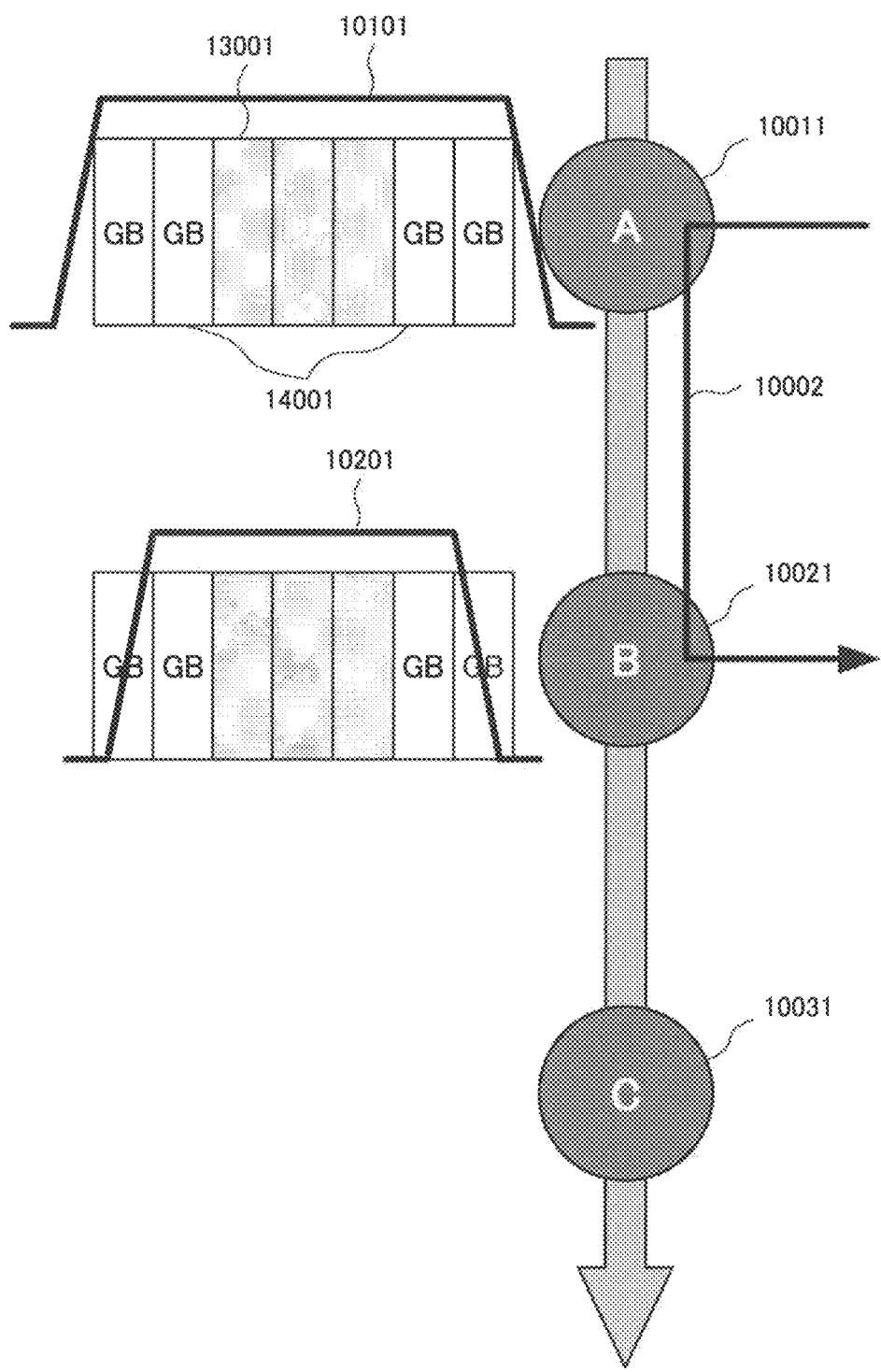
FIG. 2B is a diagram to explain a related method of allocating optical frequency band.

The related method will be described using, as an example, a case where, in an optical communication network composed of three nodes, as illustrated in FIG. 2A and FIG. 2B, a first optical path 10001 passing through three nodes (FIG. 2A) and a second optical path 10002 passing through two nodes (FIG. 2B) are set. The amount of a guard band to be provided for an optical signal band is determined by the maximum number of transitable optical nodes that is determined by symbol error rates. In the examples illustrated in FIG. 2A and FIG. 2B, the maximum number of transitable optical nodes is equal to three. It is assumed that the maximum number of transitable nodes has been obtained in advance through preliminary studies, and that all the optical paths can be set within the range of the maximum number of transitable nodes.

In the examples illustrated in FIG. 2A and FIG. 2B, the amounts of the respective guard bands in the optical frequency bands allocated to the first optical path 10001 and the second optical path 10002 are the same. FIG. 2A and FIG. 2B illustrate examples where guard bands 12001 and 14001 each of which has two slots in width are respectively provided, and one slot is 6.25 GHz in width. The amount of the guard band to be provided, will be achieved by variably controlling the passband width of each optical band pass filter (BPF) included in the optical nodes 10011 to 10031.

It is also assumed that each of the signal bands 11001 and 13001 of the first optical path 10001 and the second optical path 10002 is three slots in width. Here, it is assumed that the optical signal passes through only one optical BPF when the optical signal passes through an optical node. Consequently, the first optical path 10001 passes through three optical BPFs, and the second optical path 10002 passes through two optical BPFs.

Figure 3:
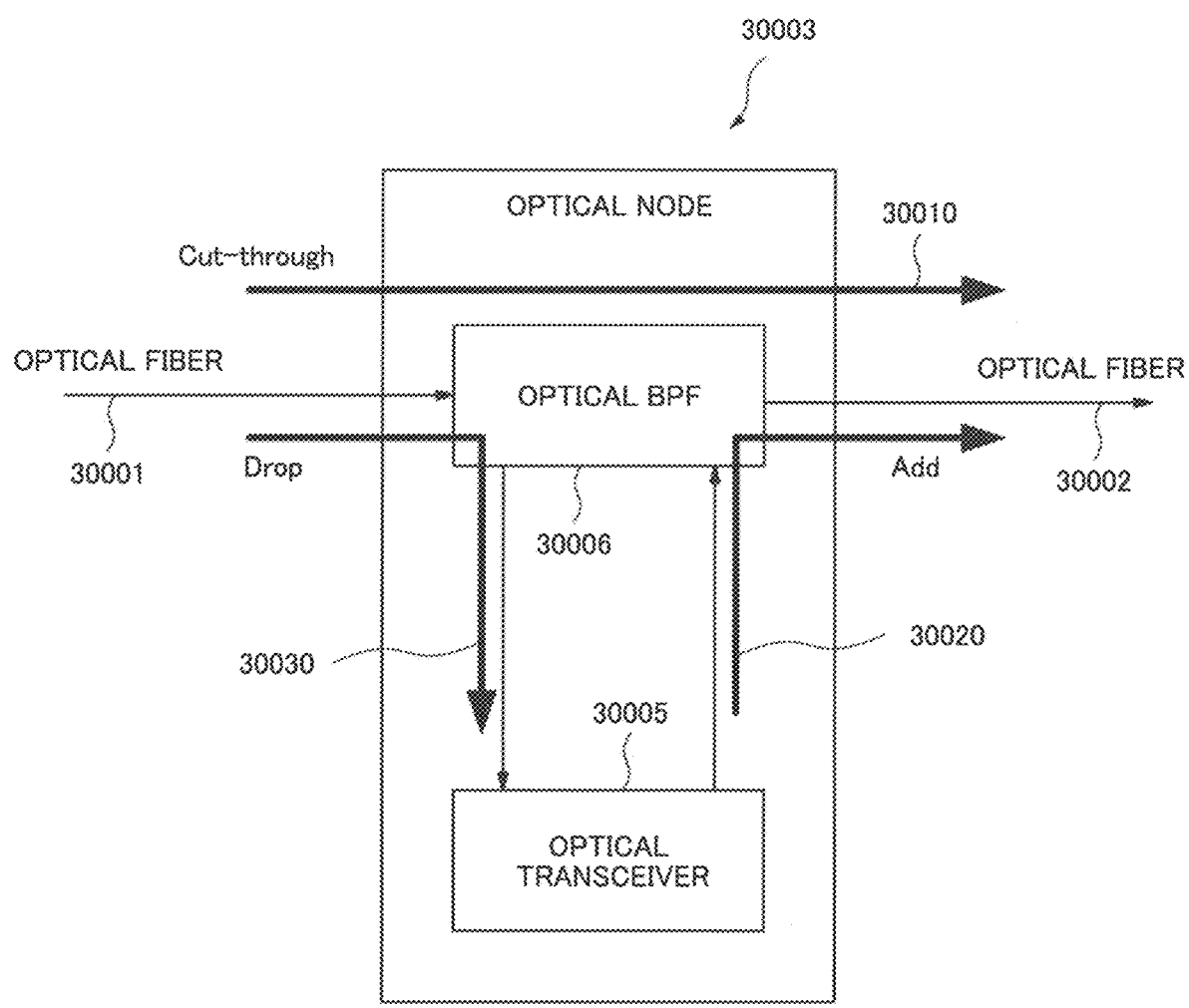
FIG. 3 is a block diagram illustrating a configuration of a related optical node.

FIG. 3 illustrates a configuration of a related optical node. A related optical node 30003 is connected to a first optical fiber 30001 and a second optical fiber 30002, and includes an optical transceiver 30005 and an optical BPF 30006. The optical node 30003 performs following three operations. That is to say, the optical node 30003 performs an operation to transmit (Add) an optical path from its own optical node to another optical node (optical path 30020), an operation to let an optical path through (Cut through) its own optical node (optical path 30010), and an operation to receive an optical path (Drop) at its own optical node (optical path 30030). The optical BPF 30006 is used to select any one of these operations.

Figure 4:
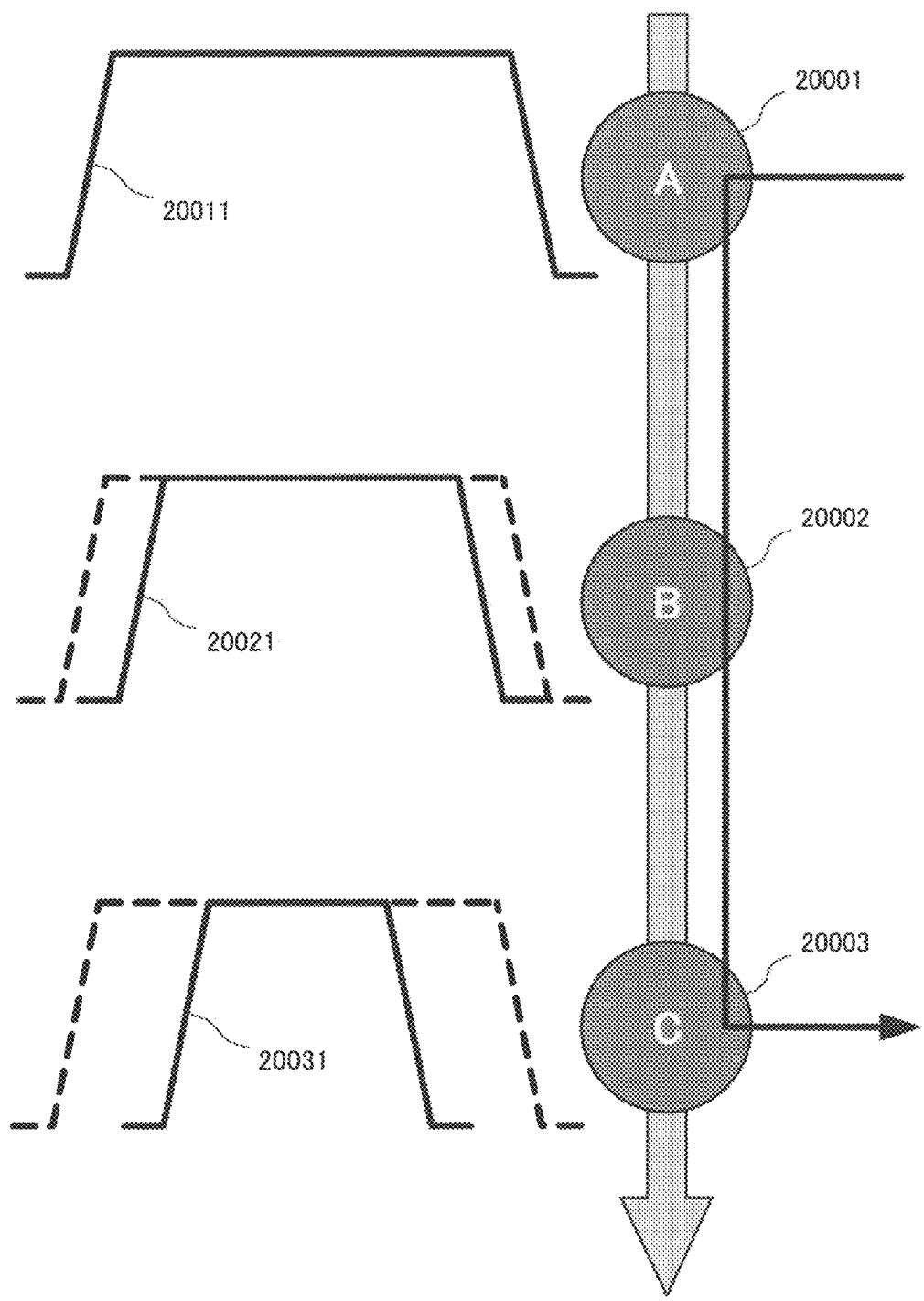
FIG. 4 is a diagram to explain the operation of a related optical BPF.

Next, the operation of the optical BPF will be described with reference to FIG. 4. The optical BPF has the passband narrowing effect as illustrated in the figure. That is to say, even though the passband widths and the optical central frequencies of the passbands of the optical BPFs included in all the optical nodes 20001 to 20003 are the same, effective passbands 20011 to 20031 become narrow as the number of stages to be passed through increases. In the example illustrated in FIG. 2A, the passband widths of the optical BPFs included in the optical nodes A, B, and C are the same. However, the effective passband widths 10101 to 10301 decrease when the first optical path 10001 passes through respective optical nodes in multistage. The number of optical BPFs to be passed through increases, which is equivalent to increasing the number of times by which the transfer function of the optical BPF is convolved. Accordingly, the passband narrowing effect of an optical BPF is a physical phenomenon that the optical BPF entails.

As mentioned above, as the number of optical nodes through which the first optical path 10001 illustrated in FIG. 2A passes increases, the effective passband widths of the optical BPFs included in the optical nodes 10011 to 10031 are reduced due to the passband narrowing effect of the optical BPF. In the example illustrated in FIG. 2A, at the node A, the optical BPF enables all the optical frequency bands including the guard band to pass through. At the node B, the effective passband width 10201 of the optical BPF is reduced compared to the effective passband width 10101 through which the first optical path 10001 passes through the node A. Consequently, one slot wide guard band at each end of the allocated optical frequency band is blocked by the optical BPF. In this case, because the signal band 11001 can pass through the optical BPF included in the node B without being blocked, the deterioration of the optical signal quality caused by the passband narrowing effect of the optical BPF does not occur. Then, when the first optical path 10001 passes through the node C, the effective passband width 10301 of the optical BPF is further reduced compared to the effective passband width when the first optical path 10001 passes through the node B. As a result, the guard band blocked by the optical BPF increases to two slots at each end of the allocated optical frequency band. That is to say, in the example illustrated in FIG. 2A, the required amount of the guard band increases by one slot every time the number of optical nodes through which the first optical path 10001 passes increases by one. However, as is the case where the first optical path 10001 passes through the node B, the deterioration of the optical signal quality caused by the passband narrowing effect of the optical BPF does not occur because the signal band 11001 is not blocked. That is to say, the deterioration of the optical signal quality does not occur because the number of nodes to be passed through is within the maximum number of transitable nodes. The example illustrated in FIG. 2A is configured not to allocate a wasteful guard band because the number of pass nodes is equal to the maximum number of nodes.

With regard to the second optical path 10002, as is the case in the first optical path 10001, the amount of the guard band 14001 is equal to two slots, and the amount of the signal band is equal to three slots in the allocated optical frequency band, as illustrated in FIG. 2B. However, the number of optical nodes to be passed through differs from that of the first optical path 10001. That is to say, the number of optical nodes through which the second optical path 10002 passes is smaller by one than that of the first optical path 10001. Consequently, the allocated guard band includes surplus one slot at each end of the signal band.

Figure 5A:
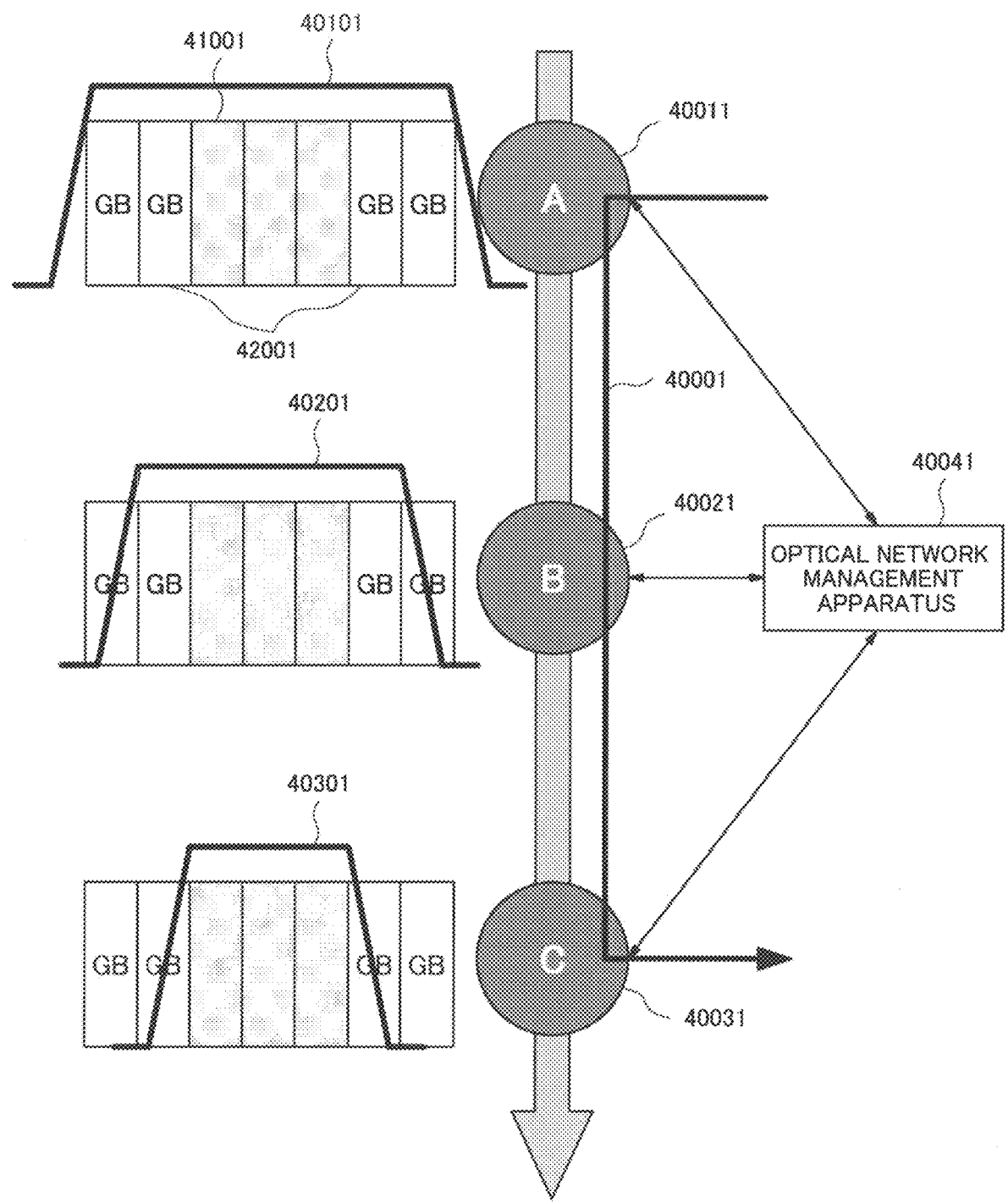
FIG. 5A is a diagram to explain the allocation of an optical frequency band to an optical path in accordance with the method of allocating optical frequency band according to the first example embodiment of the present invention.
Figure 5B:
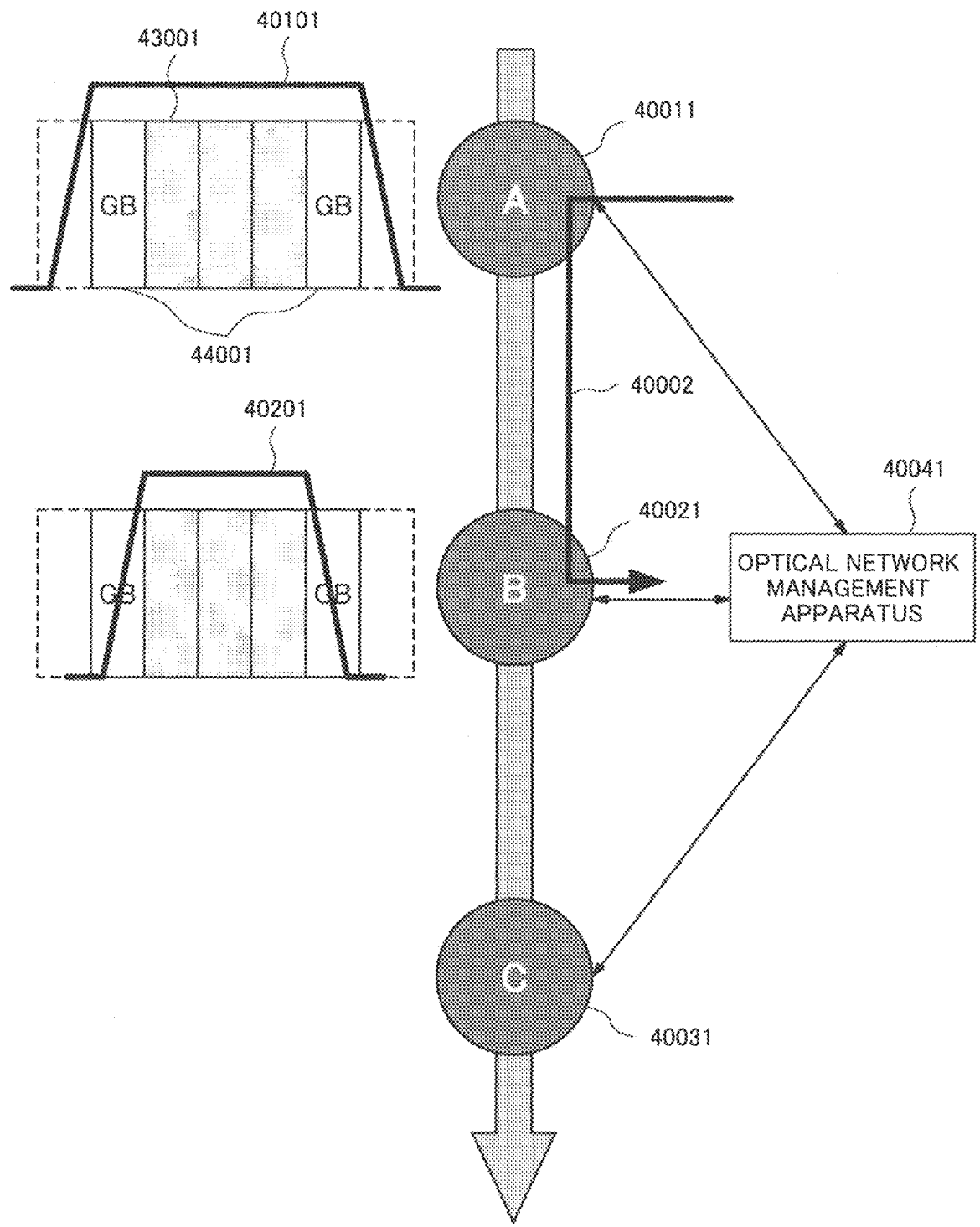
FIG. 5B is a diagram to explain the allocation of an optical frequency band to an optical path in accordance with the method of allocating optical frequency band according to the first example embodiment of the present invention.

Next, the allocation of an optical frequency band to an optical path in accordance with the method of allocating optical frequency band according to the present example embodiment of the present invention will be described in reference to FIG. 5A and FIG. 5B. The method of allocating an optical frequency band to an optical path according to the present example embodiment is characterized by making the amount of the guard band to be added variable depending on the number of optical nodes or optical BPFs through which the optical path passes.

The configuration of the optical communication network is the same as that illustrated in FIG. 2A and FIG. 2B. The method differs in that each optical node is configured to obtain, from an optical network management apparatus 40041, an amount of a guard band to be set for an optical path to be processed.

The optical network management apparatus 40041 manages all the optical paths in the optical communication network. Consequently, the optical network management apparatus 40041 accumulates information on what kind of optical path passes through, and on which optical node the optical path passes through. This enables each of optical nodes 40011 to 40031 to obtain, from the optical network management apparatus 40041, information on how many nodes the optical path to be processed passes through.

Each of the optical nodes A (40011), B (40021), and C (40031) through which a first optical path 40001 passes is notified of wavelength selection information on a wavelength selection process by the optical network management apparatus 40041. In the example illustrated in FIG. 5A, each optical node is notified by the optical network management apparatus 40041 that the first optical path 40001 passes through three optical nodes in total, that is, three stages of optical BPFs between a transmitting end and a receiving end. Concurrently, each of the optical nodes A (40011), B (40021), and C (40031) is notified that a second optical path 40002 passes through two stages of optical BPFs, as illustrated in FIG. 5B.

With regard to the optical node A and the optical node B, the first optical path 40001 and the second optical path 40002 pass through them. The optical node A and the optical node B set a guard band 42001 with two slots at each end of a signal band 41001 for the first optical path 40001 to pass through three nodes (FIG. 5A). In contrast, for the second optical path 40002 to pass through only two nodes, the optical node A and the optical node B set a guard band 44001 with one slot at each end of a signal band 43001 (FIG. 5B). With regard to the optical node C, the first optical path 40001 only passes through it. Accordingly, the optical node C sets, only for the first optical path 40001, a guard band 42001 with two slots at each end of the signal band only for the first optical path 40001, as with the optical node A and the optical node B (FIG. 5A).

The method of allocating an optical frequency band to an optical path according to the present example embodiment makes it possible to reduce the amount of the guard band to be added to the second optical path 40002 compared to the related method of allocating an optical frequency band to an optical path described with FIG. 2A and FIG. 2B, and eliminate allocation of an excess guard band. This is because the optical nodes A, B, and C can get the following information from the optical network management apparatus 40041. That is to say, the optical nodes A, B, and C can know that the first optical path 40001 passes through the optical nodes A, B, and C, and the number of nodes through which it passes is three, and that the second optical path 40002 passes through the optical nodes A and B, and the number of nodes through which it passes is two. As a result, it becomes possible for each of the optical nodes A, B, and C to set a minimum necessary guard band for the first optical path 40001 and the second optical path 40002.

Figure 6:
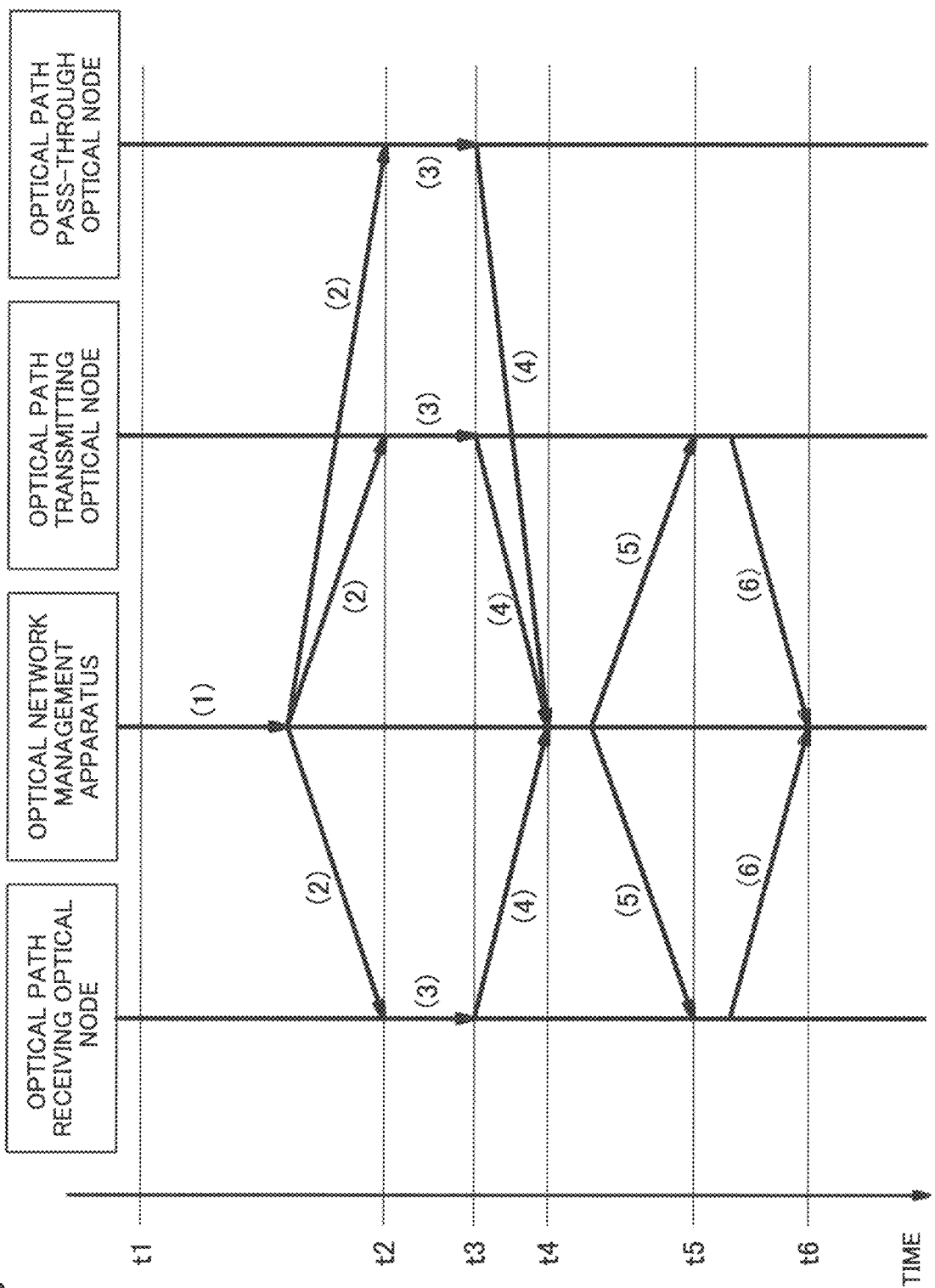
FIG. 6 is a sequence diagram to explain the allocation of the optical frequency band to the optical path in accordance with the method of allocating optical frequency band according to the first example embodiment of the present invention.
Figure 7:
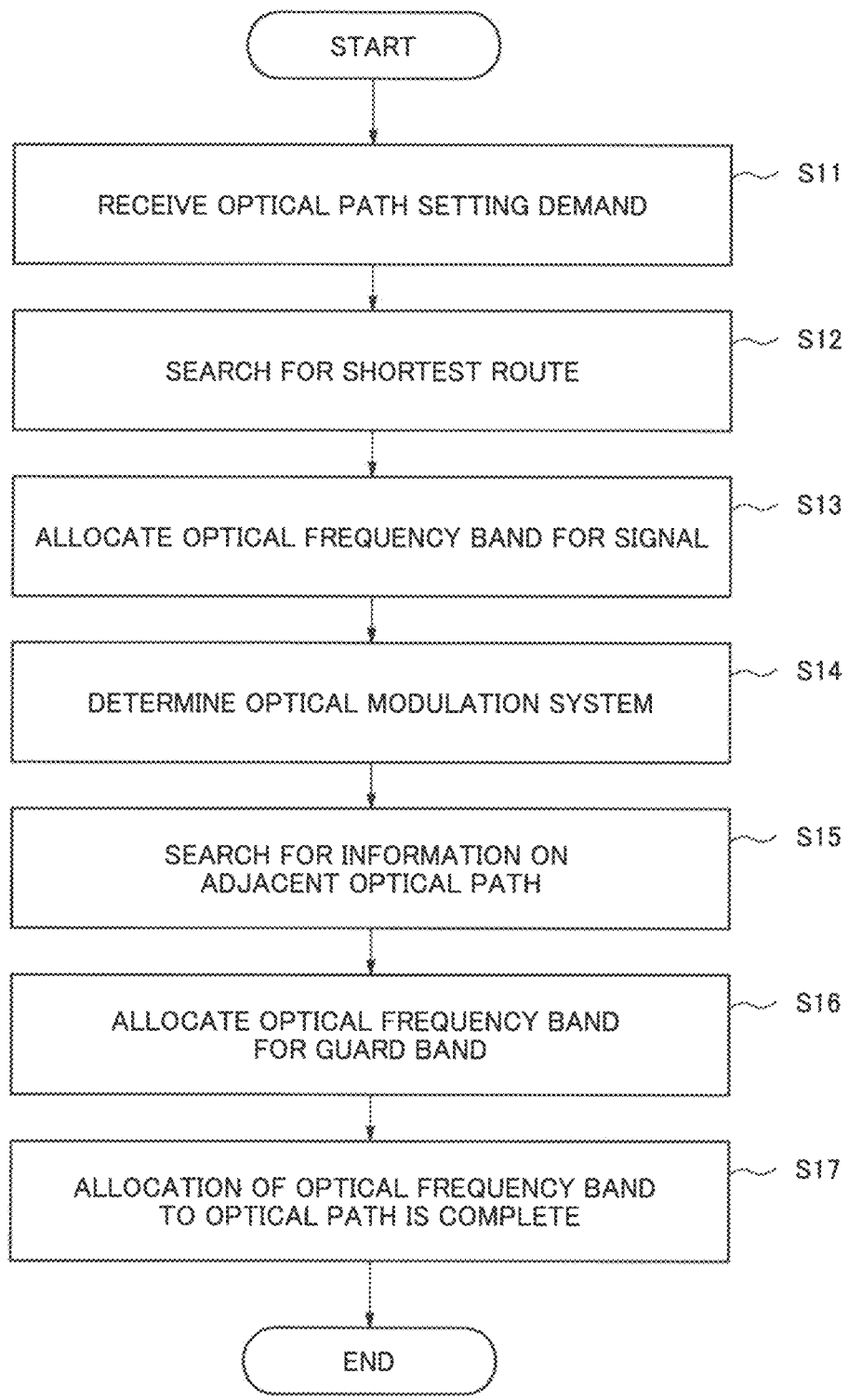
FIG. 7 is a flowchart to explain the operation of the optical network management apparatus according to the first example embodiment of the present invention.

Next, the allocation of an optical frequency band to an optical path according to the method of allocating optical frequency band of the present example embodiment will be described in more detail with FIG. 6 and FIG. 7. FIG. 6 is a sequence diagram, and FIG. 7 is a flowchart.

First, the optical network management apparatus allocates an optical frequency band for a signal based on an optical path setting demand at time t1 ((1) in FIG. 6). The operation of the optical network management apparatus for this will be described with FIG. 7.

The optical network management apparatus receives an optical path setting demand (step S11), and searches for a shortest route connecting a transmitting source and a receiving destination of an optical signal in accordance with the optical path setting demand (step S12). Next, the optical network management apparatus searches for an available unoccupied optical frequency band on the route obtained from the search results. If there is an unoccupied optical frequency band, the optical network management apparatus allocates the unoccupied optical frequency band to an optical path serving as an optical frequency band for a transfer signal (step S13). The optical network management apparatus then determines an optical modulation system that can transmit optical signals over a distance longer than the route length of the optical path (step S14). In the shortest route search (step S12) and the unoccupied optical frequency band search (step S13), if neither route nor unoccupied optical frequency band cannot be found, the optical network management apparatus fails in the optical path setting, and cannot satisfy the optical path setting demand.

After the optical frequency band allocation for the signal (step S13) has been completed, the optical network management apparatus searches for the information on an optical path adjacent to the optical frequency band of the optical path that has been allocated (step S15). If the signal-transmitting source and the receiving destination of the adjacent optical path are the same as those of the optical path for the signal, and the optical modulation systems for them are the same, an optical frequency band for a guard band is not allocated. In other cases, an optical frequency band for a guard band is allocated in accordance with the method described with FIG. 5A and FIG. 5B (step S16). The allocation of the optical frequency band for the signal and the allocation of the optical frequency band for the guard band have been finished, and then the allocation of the optical frequency band to the optical path has been completed (step S17).

Subsequently, the optical network management apparatus notifies the optical nodes associated with the optical path set in the above-mentioned process ((1) in FIG. 6) of an optical frequency passband width to be set at the optical BPF included in each optical node device ((2) in FIG. 6). The optical nodes associated with the optical path are a transmitting optical node, a pass-through optical node, and a receiving optical node.

Each optical node device associated with the optical path having been set in the above-mentioned process ((1) in FIG. 6) sets the optical frequency passband width in the built-in optical BPF based on the information notified at time t2 by the optical network management apparatus ((3) in FIG. 6). At time t3, the setting of the optical frequency passband width of the optical BPF included in each optical node device has been completed. The optical BPF included in each optical node device is configured to change the optical frequency band bandwidth by 6.25 GHz that is the standardized optical frequency slot width. The optical frequency slot width is standardized by the Telecommunication Standardization Sector of the International Telecommunication Union (ITU-T) (Recommendation ITU-T G.694.1).

Each optical node device notifies the optical network management apparatus that the setting of the optical frequency passband has been completed ((4) in FIG. 6).

The optical network management apparatus confirms at time t4 that all the optical node devices associated with the optical path have completed setting the optical frequency passband width. Then the optical network management apparatus sends a starting notice of transmission and reception of an optical signal to a transmitting source optical node and a receiving destination optical node ((5) in FIG. 6).

Each of the transmitting source optical node and the receiving destination optical node having received the starting notice at time t5 starts transmitting and receiving the optical signal, and notifies the optical network management apparatus of the start of transmission and the start of reception ((6) in FIG. 6). The optical network management apparatus confirms at time t6 that the transmission and the reception of the optical signal have been started between the transmitting source optical node and the receiving destination optical node of the optical signal, by which the optical network management apparatus considers the optical path to be open.

As described above, according to the optical network management apparatus and the method of allocating optical frequency band of the present example embodiment, in an optical communication network using a wavelength division multiplexing system, it is possible to improve the usage efficiency of the optical communication network even though the passband narrowing effect occurs in the wavelength selection process.

Second Example Embodiment

Figure 8:
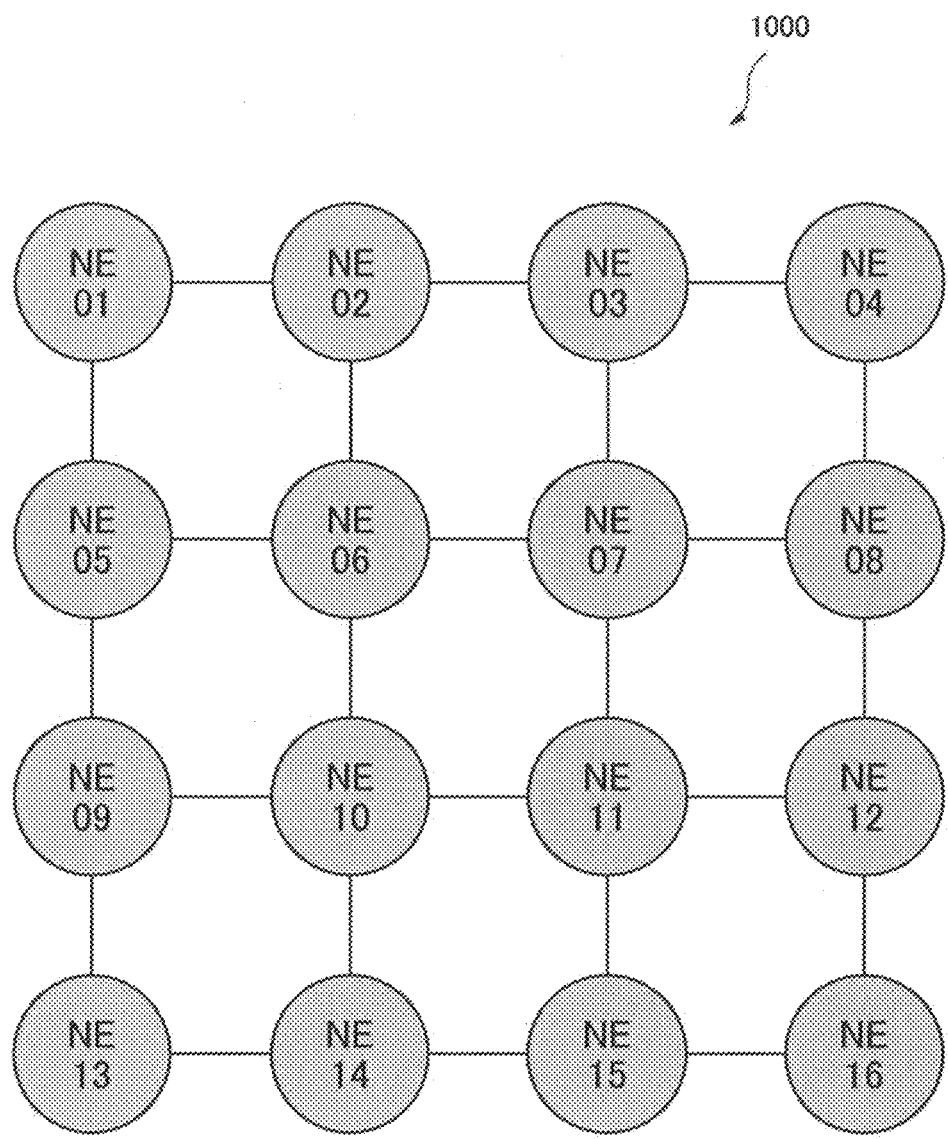
FIG. 8 is a diagram schematically illustrating a configuration of an optical communication network that an optical network management apparatus according to a second example embodiment of the present invention manages.

Next, a second example embodiment of the present invention will be described. FIG. 8 schematically illustrates a configuration of an optical communication network 1000 that an optical network management apparatus according to the present example embodiment manages. The configuration of the optical network management apparatus according to the present example embodiment is the same as that of the first example embodiment (see FIG. 1A).

As illustrated in the figure, the optical communication network 1000 has a 4×4 mesh topology, and is an optical communication network composed of 16 optical nodes. In the present example embodiment, there is a connection demand for each optical path with a four-slot-wide signal band from each optical node to another optical node. That is to say, one optical path is required for each of different optical nodes, such as optical paths from the optical node NE01 to the optical nodes NE02 to NE16, optical paths from NE02 to NE01 and NE03 to NE16, and optical paths from NE03 to NE01, NE02, and NE04 to NE16. Consequently, the total number of optical paths in the optical communication network 1000 illustrated in FIG. 8 is equal to 240 (=16×15).

Figure 9:
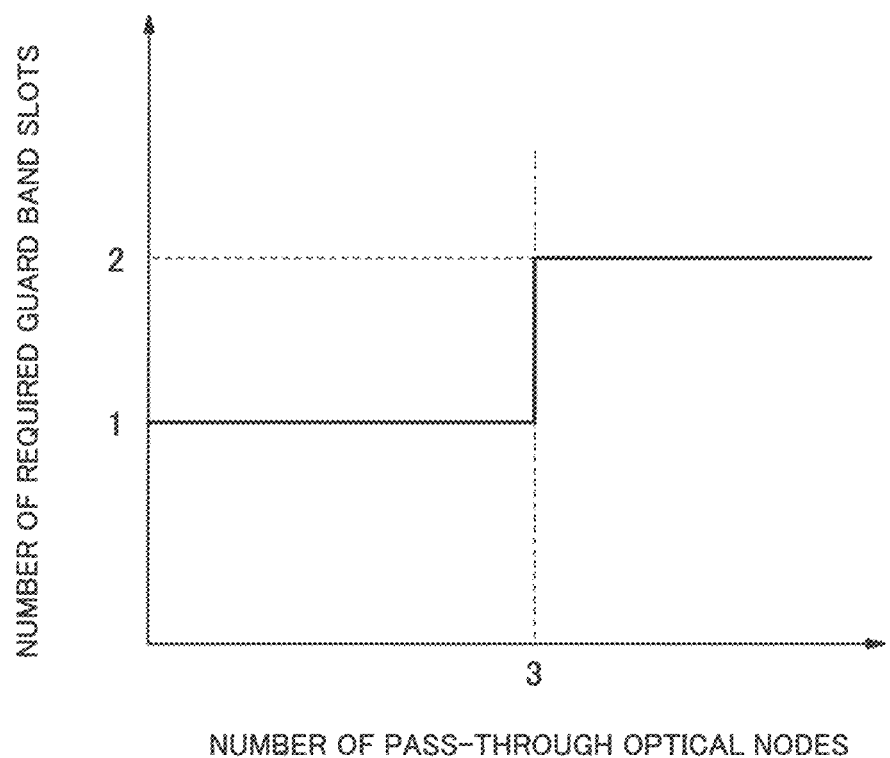
FIG. 9 is a diagram illustrating a relationship between the number of optical nodes and the number of slots of a required guard band that is registered in the optical network management apparatus according to the second example embodiment of the present invention.

A relationship between the number of optical nodes through which the optical path passes and the number of slots of required guard band as illustrated in FIG. 9 is registered in the optical network management apparatus. FIG. 9 illustrates as an example a case where the number of required guard band slots varies at the boundary where the number of pass-through optical nodes is three. The number of slots of required guard band represents, by the number of slots, a bandwidth of the guard band required to keep the optical signal quality from deteriorating due to the passband narrowing effect of the optical BPF included in each optical node device.

The optical network management apparatus searches for an optical path connecting, in the shortest route, the optical node NE01 to the optical node NE06 illustrated in FIG. 8, for example. One of the shortest routes is a route indicated as NE01→NE05→NE06, and the number of optical nodes passed through is three in this case. Consequently, in accordance with the example illustrated in FIG. 9, the required guard band is equivalent to one slot in the present example embodiment. Each optical node device can obtain, through the optical network management apparatus, a relationship between the number of optical nodes through which the optical path passes and the number of slots of the required guard band, as illustrated in FIG. 9.

In addition, each of the optical nodes NE01, NE05, and NE06 that are associated with the optical path represented by NE01→NE05→NE06 is notified by the optical network management apparatus that the number of nodes through which the optical path represented by NE01→NE05→NE06 passes is three. As a result, according to the present example embodiment, the optical node devices NE01, NE05, and NE06 provide each end of the signal band with a band with one slot that is the minimum necessary amount of the guard band to connect the optical path represented by NE01→NE05→NE06. This enables each optical node device to create the optical path represented by NE01→NE05→NE06 having a band with six slots in total.

The minimum necessary guard band is similarly set for the other optical paths. For example, one of the shortest routes connecting NE01 to NE14 is a route represented by NE01→NE05→NE09→NE13→NE14. In this case, because the number of optical nodes through which the optical path passes is five, the minimum necessary amount of the guard band to be added is equivalent to two slots from the relationship in FIG. 9. Consequently, the optical network management apparatus according to the present example embodiment creates, in cooperation with the optical node devices NE01, NE05, NE09, NE13, and NE14, an optical path represented by NE01→NE05→NE09→NE13→NE14 to which the guard band with two slots is added. The optical path represented by NE01→NE05→NE09→NE13→NE14 includes the signal band with four slots, and has an optical frequency band with eight slots in total where a guard band with two slots is added to each end of the signal band.

Figure 10:
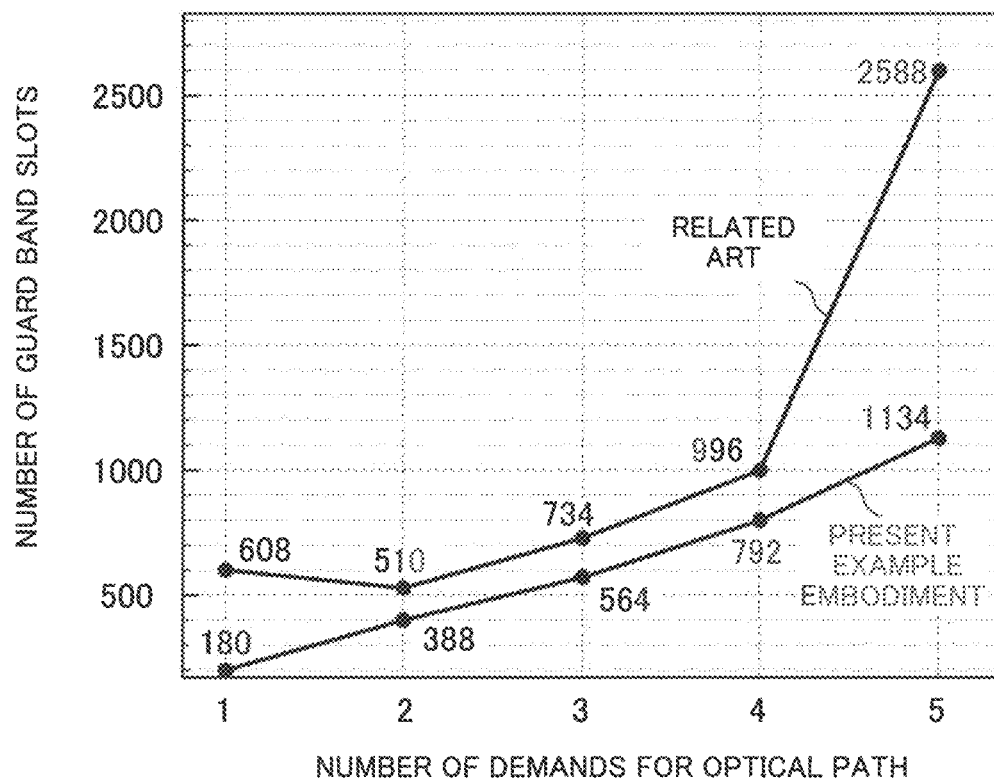
FIG. 10 is a diagram illustrating the calculation results of the total amount of the guard bands determined by the method of allocating optical frequency band according to the second example embodiment of the present invention.

In the optical communication network 1000 illustrated in FIG. 8, the amount of the guard band to be added can be determined in accordance with the above-mentioned method of allocating optical frequency band according to the present example embodiment, and the total amount of the required guard bands can be calculated. The results are illustrated in FIG. 10.

A case will be described as an example in which the number of demands for optical paths between optical nodes is one, that is, the total number of all the optical paths is equal to 240. In the above-mentioned related method of allocating optical frequency band, a guard band with two slots is added to each end regardless of the number of optical nodes through which an optical path passes. In this case, the total amount of the guard bands to be required is equal to 608 slots taking into consideration that another optical path may not be allocated to a wavelength band adjacent to the optical path. In contrast, if the method of allocating optical frequency band according to the present example embodiment is applied, the total amount of the guard bands to be required becomes equal to 180 slots when the number of optical nodes through which an optical path passes is three or less, taking into consideration that the guard band to be added can be reduced from two slots to one slot. Therefore, the total amount of the guard bands to be required can be reduced to one-third according to the present example embodiment. If the number of demands for optical path between optical nodes increases, the total amount of the required guard bands also increases. When the method of allocating optical frequency band according to the present example embodiment is compared to the related allocation method, according to the method of allocating optical frequency band of the present example embodiment, the amount of the guard band can be reduced by 20% on average compared to the related allocation method. As described above, according to the method of allocating optical frequency band of the present example embodiment, the amount of the required guard band can be minimized with respect to each optical path; as a result, it is possible to achieve an effect of reducing the total amount of the guard band for all the optical paths.

Figure 11:
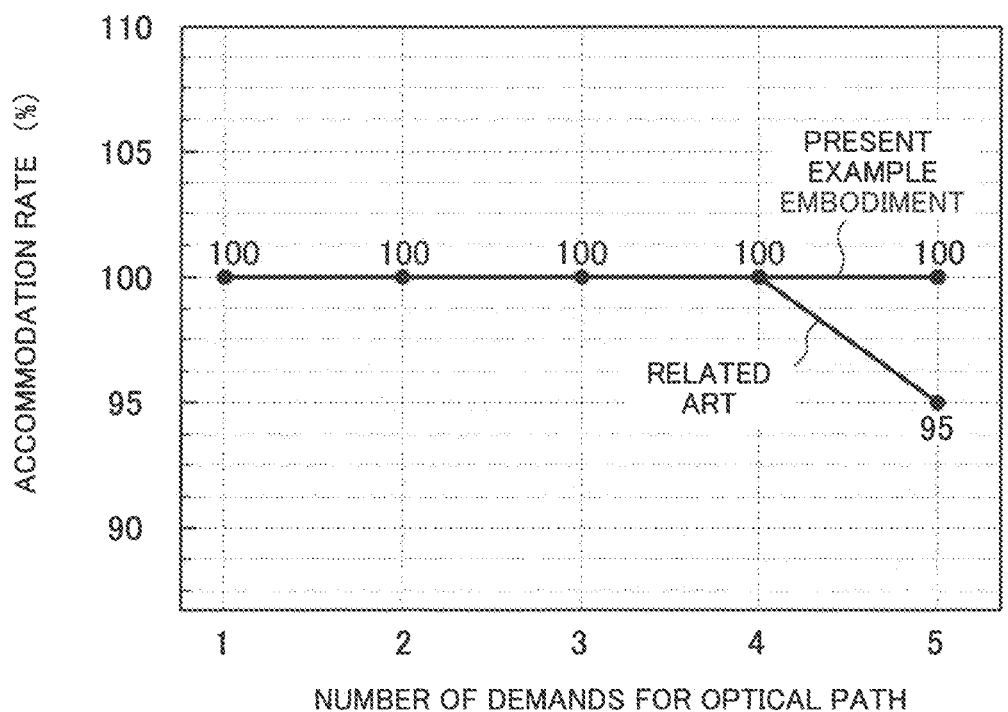
FIG. 11 is a diagram illustrating the calculation results of an accommodation rate of information signals to an optical path in accordance with the method of allocating optical frequency band according to the second example embodiment of the present invention.

FIG. 11 illustrates the calculation results of accommodation rate of information signal to an optical path in the optical communication network 1000 illustrated in FIG. 8. The horizontal axis represents the number of demands for optical path between optical nodes, and the vertical axis represents the accommodation rate to an optical path.

The accommodation rate is defined as a ratio of the amount of information that is successfully communicated by opening an optical path to the total amount of information to be communicated. Accordingly, if all the optical paths are successfully opened, the accommodation rate becomes 100%. If the total amount of information to be communicated increases, the wavelength band becomes insufficient when the wavelength band of the network is constant. Consequently, as the total amount of information to be communicated (in bit per second) increases, the probability of failing in opening an optical path increases, and the accommodation rate decreases from 100%.

When the number of demands for optical path between optical nodes is five, the optical frequency resources become insufficient according to the related art; as a result, an information communication bit arises that cannot be accommodated in the optical path. Therefore, the accommodation rate does not become 100%. In contrast, according to the method of allocating optical frequency band of the present example embodiment, it is possible to reduce the amount of the guard band to be provided for the optical path; therefore, the accommodation rate does not decrease, and all the information communication bits can be accommodated in an optical path. That is to say, the method of allocating optical frequency band of the present example embodiment makes it possible to improve the usage efficiency of the optical communication network.

As described above, according to the optical network management apparatus and the method of allocating optical frequency band of the present example embodiment, in an optical communication network using a wavelength division multiplexing system, it is possible to improve the usage efficiency of the optical communication network even though the passband narrowing effect occurs in the wavelength selection process.

Third Example Embodiment

Figure 12:
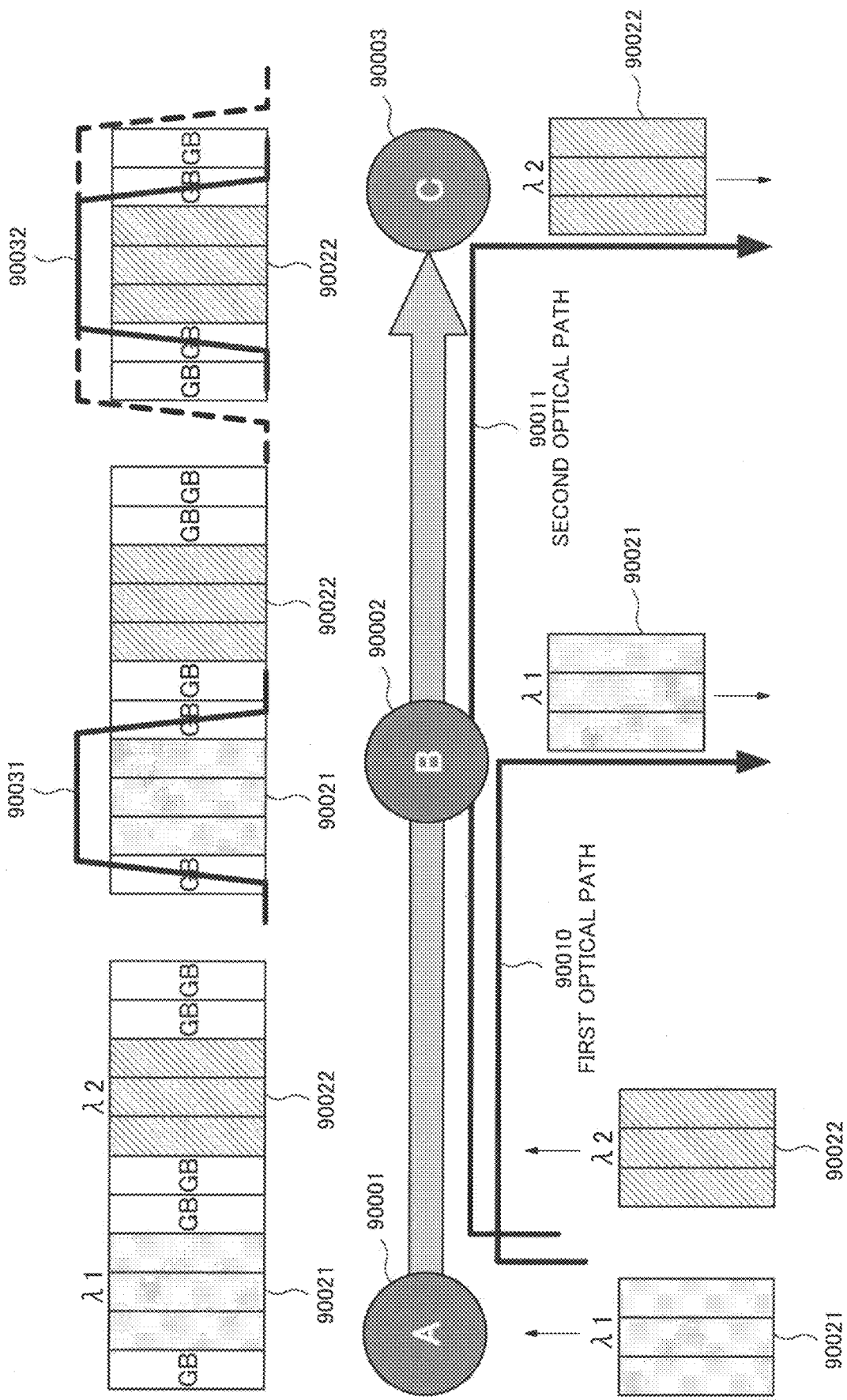
FIG. 12 is a diagram to explain the allocation of an optical frequency band to an optical path in accordance with an method of allocating optical frequency band according to a third example embodiment of the present invention.

Next, a third example embodiment of the present invention will be described. A case will be described in the present example embodiment in which a first optical path 90010 (center wavelength λ1) and a second optical path 90011 (center wavelength λ2) with their central frequencies adjacent to each other are multiplexed as illustrated in FIG. 12. The operations of an optical network management apparatus and an optical BPF included in an optical node device according to the present example embodiment are the same as those in the above-mentioned example embodiments. That is to say, the optical network management apparatus determines the amount of the guard band to be added to a signal band, and allocates an optical frequency band with respect to each optical path.

In the example illustrated in FIG. 12, because the first optical path 90010 passes through an optical node A and an optical node B, the number of optical BPFs through which the first optical path passes is equal to two. The relationship between the number of optical nodes to be passed through and the number of slots of required guard band is obtained in advance as illustrated in FIG. 9, and the number of minimum necessary guard band slots is one for the first optical path 90010. In contrast, because the second optical path 90011 passes through the optical node A, the optical node B, and an optical node C, the number of optical BPFs to be passed through is equal to three. Consequently, the number of minimum necessary guard band slots becomes two for the second optical path 900112 in the present example embodiment.

As described above, the central frequencies of the first optical path 90010 and the second optical path 90011 are adjacent to each other, and the number of guard band slots for the first optical path 90010 differs from the number of guard band slots for the second optical path 90011. In this case, the number of slots of a guard band that should be set at the midpoint of the center wavelength λ1 and the center wavelength λ2 becomes either one, which is the number of slots of the guard band to be provided for the first optical path 90010, or two, which is the number of slots of the guard band to be provided for the second optical path 90011.

In this case, the optical network management apparatus according to the present example embodiment preferentially sets the one having the greater number of guard band slots. That is to say, the optical network management apparatus according to the present example embodiment sets a two-slot-wide guard band between the signal band 90021 of the first optical path 90010 and the signal band 9022 of the second optical path 90011. This causes the signal band 90021 of the first optical path 90010 not to be blocked by the effective passband width 90031 when the first optical path 90010 passes through the optical node B. The signal band 90022 of the second optical path 90011 is not blocked by the effective passband width 90032 when the second optical path 90011 passes through the optical node C.

As described above, if the optical path includes a first optical path and a second optical path that are adjacent to each other, the optical network management apparatus of the present example embodiment can be configured to choose the one having the larger bandwidth as a guard band (a protection band) between a first guard band (protection band) for the first optical path and a second guard band (protection band) for the second optical path. That is to say, the optical network management apparatus of the present example embodiment calculates the bandwidth of the first guard band (protection band) that becomes a guard band (protection band) for the first optical path with the center wavelength equal to λ1 (first wavelength). The optical network management apparatus of the present example embodiment also calculates the bandwidth of the second guard band (protection band) that becomes a guard band (protection band) for the second optical path with the center wavelength equal to a second wavelength (λ2) lying next to the first wavelength (λ1) on the wavelength grid. The optical network management apparatus of the present example embodiment can be configured to choose the one having the larger bandwidth as the guard band (protection band).

As described above, according to the optical network management apparatus and the method of allocating optical frequency band of the present example embodiment, in an optical communication network using a wavelength division multiplexing system, it is possible to improve the usage efficiency of the optical communication network even though the passband narrowing effect occurs in the wavelength selection process.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

REFERENCE SIGNS LIST

100, 40041 optical network management apparatus
110 wavelength selection information generating means
120 wavelength selection information notifying means
200 optical node device
210 wavelength selection information receiving means
220 optical band pass filter 230 control means
1000 optical communication network
10001, 40001, 90010 first optical path
10002, 40002, 90011 second optical path
10011 to 10031, 20001 to 20003, 40011 to 40031 optical node
10101 to 10301, 20011 to 20031, 90031, 90032 effective passband width
11001, 13001, 41001, 90021, 90022 signal band
12001, 14001, 42001, 44001 guard band
30001 first optical fiber
30002 second optical fiber
30003 related optical node
30005 optical transceiver
30006 optical BPF
30010, 30020, 30030 optical path

The invention claimed is:

1. An optical network management apparatus, comprising:
    a wavelength selection information generating section configured to generate wavelength selection information on a wavelength selection process through which an optical path accommodating an information signal goes; and
    a guard band determining section configured to determine allocation of a guard band in the wavelength selection process with respect to each optical path, based on the wavelength selection information.

2. The optical network management apparatus according to claim 1,
    wherein the wavelength selection information is information, with respect to each optical path, on the guard band to be added to a frequency band for the information signal.

3. The optical network management apparatus according to claim 1,
    wherein the wavelength selection information is information on a frequency of the wavelength selection process through which the optical path goes.

4. The optical network management apparatus according to claim 1,
    wherein the allocation of the guard band includes changing a bandwidth of the guard band depending on a frequency of the wavelength selection process.

5. The optical network management apparatus according to claim 1, further comprising:
    a wavelength selection information notifying section configured to notify an optical node device of information on the guard band, the optical path going through the optical node device.

6. The optical network management apparatus according to claim 1, wherein the guard band determining section, when determining the guard band for a first optical path with a center wavelength equal to a first wavelength, and the guard band for a second optical path with a center wavelength equal to a second wavelength lying next to the first wavelength on a wavelength grid, chooses, between a bandwidth of the guard band for the first optical path and a bandwidth of the guard band for the second optical path, a guard band having a larger bandwidth as the guard band in the wavelength selection process.

7. The optical network management apparatus according to claim 1,
    wherein the optical path is preferentially set in an order of frequency of the wavelength selection process from smallest.

8. An optical node device, comprising:
    an optical band pass filter configured to perform a wavelength selection process through which an optical path accommodating an information signal goes; and
    a controller configured to set, based on wavelength selection information, a passband width of the optical band pass filter,
    wherein the wavelength selection information is information on the wavelength selection process with respect to each optical path, and
    wherein the passband width is a bandwidth including a frequency band for the information signal and a guard band to be added to the frequency band.

9. The optical node device according to claim 8, further comprising:
    a wavelength selection information receiving section configured to receive the wavelength selection information,
    wherein the controller sets the passband width based on the wavelength selection information received by the wavelength selection information receiving section, when the optical path goes through the optical node device.

10. An optical network management method, comprising:
    generating wavelength selection information on a wavelength selection process through which an optical path accommodating an information signal goes; and
    determining allocation of a guard band in the wavelength selection process with respect to each optical path, based on the wavelength selection information.

11. The optical network management method according to claim 10,
    wherein the wavelength selection information is information, with respect to each optical path, on the guard band to be added to a frequency band for the information signal.

12. The optical network management method according to claim 10,
    wherein the wavelength selection information is information on a frequency of the wavelength selection process through which the optical path goes.

13. The optical network management method according to claim 10,
    wherein the allocation of the guard band includes changing a bandwidth of the guard band depending on a frequency of the wavelength selection process.

14. The optical network management method according to claim 10, further comprising:
    a wavelength selection information notifying section configured to notify an optical node device of information on the guard band, the optical path going through the optical node device.

15. The optical network management method according to claim 10, wherein the guard band determining section, when determining the guard band for a first optical path with a center wavelength equal to a first wavelength, and the guard band for a second optical path with a center wavelength equal to a second wavelength lying next to the first wavelength on a wavelength grid, chooses, between a bandwidth of the guard band for the first optical path and a bandwidth of the guard band for the second optical path, a guard band having a larger bandwidth as the guard band in the wavelength selection process.

16. The optical network management method according to claim 10,
    wherein the optical path is preferentially set in an order of frequency of the wavelength selection process from smallest.

17. A method for an optical node, comprising:
- performing a wavelength selection process with an optical filter through which an optical path accommodating an information signal goes; and
- setting, based on wavelength selection information, a passband width of the optical band pass filter,
- wherein the wavelength selection information is information on the wavelength selection process with respect to each optical path, and
- wherein the passband width is a bandwidth including a frequency band for the information signal and a guard band to be added to the frequency band.

18. The method according to claim 17, further comprising:
- receiving the wavelength selection information,
- wherein the passband width is set based on the received wavelength selection information, when the optical path goes through the optical node.

19. An optical network management apparatus, comprising:
- at least one processor configure to implement:
    - a wavelength selection information generating section configured to generate wavelength selection information on a wavelength selection process through which an optical path accommodating an information signal goes; and
    - a guard band determining section configured to determine allocation of a guard band in the wavelength selection process with respect to each optical path, based on the wavelength selection information.

20. The optical network management apparatus according to claim 19, wherein the at least one processor is configured to implement:
- a wavelength selection information notifying section configured to notify an optical node device of information on the guard band, the optical path going through the optical node device.

\* \* \* \* \*